(12) United States Patent
Kuo

(10) Patent No.: US 7,576,981 B2
(45) Date of Patent: Aug. 18, 2009

(54) PORTABLE COMPUTER WITH HANDLE

(75) Inventor: Szu-Wei Kuo, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 173 days.

(21) Appl. No.: 11/840,229

(22) Filed: Aug. 17, 2007

(65) Prior Publication Data

US 2008/0158806 A1 Jul. 3, 2008

(30) Foreign Application Priority Data

Dec. 28, 2006 (CN) .................. 2006 1 0201436

(51) Int. Cl.
*G06F 1/16* (2006.01)
(52) U.S. Cl. .................. 361/679.59; 70/58; 361/679.57
(58) Field of Classification Search .................. 361/679.57–679.59; 70/58
See application file for complete search history.

(56) References Cited

U.S. PATENT DOCUMENTS

| | | | | | |
|---|---|---|---|---|---|
| 4,901,261 | A | * | 2/1990 | Fuhs | .................. 361/679.58 |
| 4,951,241 | A | * | 8/1990 | Hosoi et al. | ............ 361/679.59 |
| 5,011,198 | A | * | 4/1991 | Gruenberg et al. | ............ 292/41 |
| 5,235,495 | A | * | 8/1993 | Blair et al. | ............. 361/679.59 |
| 5,293,300 | A | * | 3/1994 | Leung | .................. 361/679.59 |
| 5,351,508 | A | * | 10/1994 | Kelley | ........................... 70/58 |
| 6,115,883 | A | * | 9/2000 | Um | ............................. 16/405 |
| 7,054,152 | B2 | * | 5/2006 | Francke et al. | ......... 361/679.55 |
| 7,206,198 | B2 | * | 4/2007 | Wang | .................... 361/679.59 |
| 7,342,778 | B2 | * | 3/2008 | Fan et al. | ....................... 70/58 |

\* cited by examiner

*Primary Examiner*—Lisa Lea-Edmonds
(74) *Attorney, Agent, or Firm*—Frank R. Niranjan

(57) ABSTRACT

A portable computer includes a cover unit, a base unit pivotably connected to the cover unit, and a handle pivotably mounted to the base unit. The handle forms a cross bar, and at least one locking tab. The locking tab is engagable with a sidewall of the base unit to keep the cross bar abutting against the cover unit for preventing the cover unit being pivoted open.

18 Claims, 5 Drawing Sheets

PORTABLE COMPUTER WITH HANDLE

BACKGROUND

1. Field of the Invention

The present invention relates to portable computers, and particularly to a portable computer with a handle which can prevent unauthorized opening of the portable computer.

2. Description of Related Art

Portable computers are more and more popular because they are small, light, and easy to carry. A bag may used to carry the portable computer, or a handle on the portable computer may be used. The handle is usually pivotably mounted to the portable computer. Additionally, a lock and chain is often used on the portable computer for preventing theft of the portable computer. The chain is commonly made of steel, or other strong material. A loop is formed on a free end of the chain. When the lock is used, the chain is passed around a fixture, such as a water pipe. The lock is extended through the loop, and with a portion of the portable computer. Therefore, the portable computer cannot be moved further than the length of the chain. However, the lock is not designed to prevent the portable computer from being opened.

What is desired, therefore, is a portable computer with a handle which can prevent unauthorized opening of the portable computer.

SUMMARY

An exemplary portable computer includes a cover unit, a base unit pivotably connected to the cover unit, and a handle pivotably mounted to the base unit. The handle forms a cross bar, and at least one locking tab. The locking tab is engagable with a sidewall of the base unit to keep the cross bar abutting against the cover unit for preventing the cover unit being pivoted open.

Other advantages and novel features of the present invention will become more apparent from the following detailed description of a preferred embodiment when taken in conjunction with the accompanying drawings, in which:

DETAILED DESCRIPTION

Figure 1:
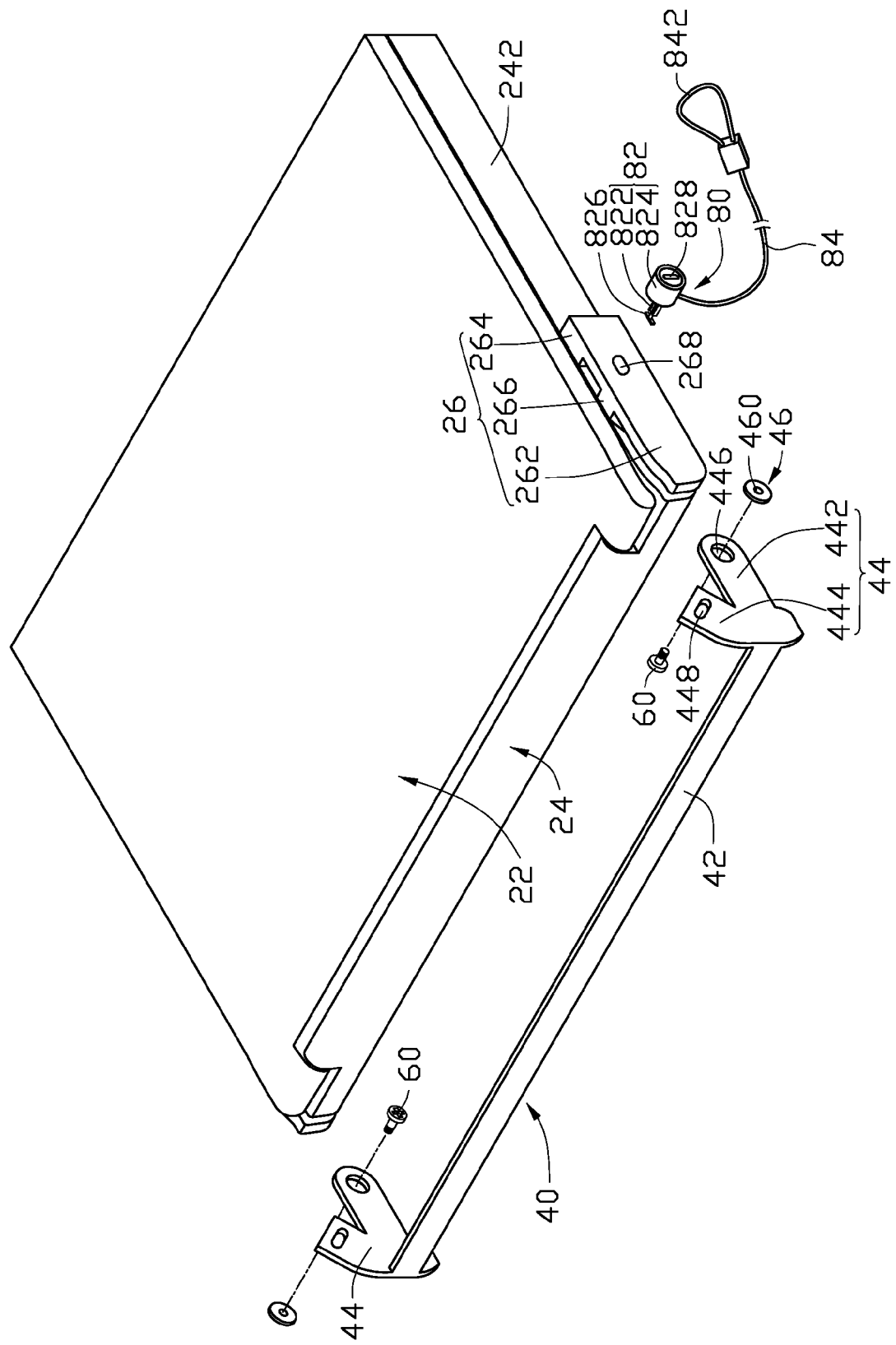
FIG. 1 is an exploded, isometric view of a portable computer in accordance with an embodiment of the present invention, the portable computer including a base unit, a handle, and a lock set.
Figure 2:
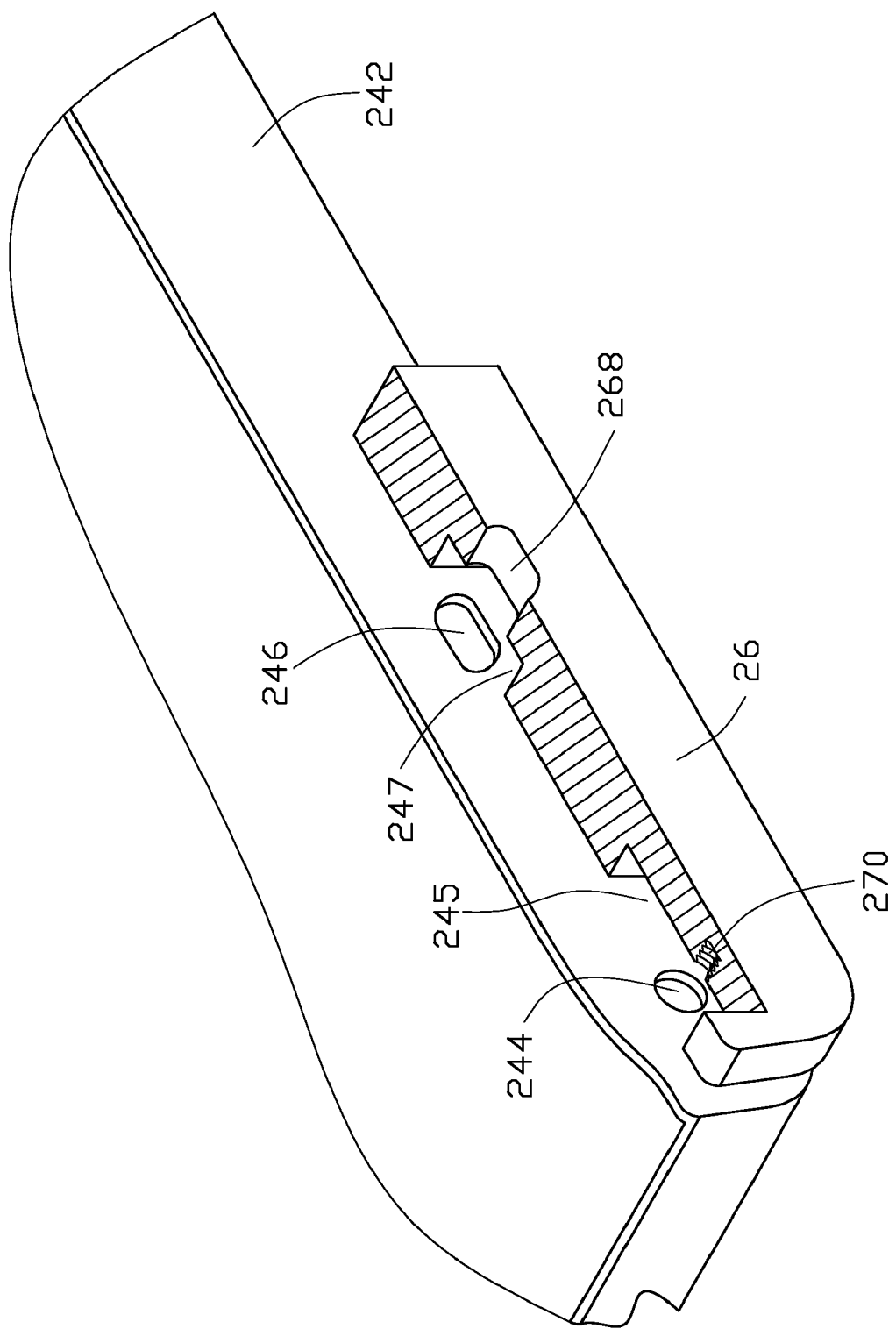
FIG. 2 is a view of a part of the base unit, but partly cutaway.

Referring to FIGS. 1 and 2, a portable computer in accordance with a preferred embodiment of the present invention is shown. The portable computer includes a cover unit 22 having a display installed therein, a base unit 24 having a keyboard supported thereon and pivotably connected to a rear end of the cover unit 22, and a loss prevention device for preventing unauthorized opening and/or theft of the portable computer. The loss prevention device includes a handle 40 fixed to the base unit 24, and a lock set 80.

The base unit 24 includes two opposite sidewalls 242. Each sidewall 242 defines a round hole 244 and an elongate locking hole 246 in a rear end thereof, and forms a fixing portion 26 on the rear end. The fixing portion 26 is generally F-shaped, and includes a plate 262, and two fixing legs 264, 266 connecting the plate 262 with the sidewall 242. The fixing legs 264, 266 are integrally formed on the sidewall 242, at two sides of the locking hole 246. The sidewall 242, the plate 262, and the fixing legs 264, 266 cooperatively define two receiving spaces 245, 247. An elongate through hole 268 is defined in the plate 262 of the fixing portion 26, aligned with the locking hole 246 of the sidewall 242. A threaded hole 270 is defined in an inner surface of the plate 262 of the fixing portion 26, aligned with the round hole 244 of the sidewall 242.

The handle 40 includes a cross bar 42, and two installing portions 44 perpendicular to and respectively extending from two ends of the cross bar 42. Each installing portion 44 includes a fixing tab 442, and a locking tab 444. The fixing tab 442 and the locking tab 444 cooperatively define an acute angle therebetween. The fixing tab 442 includes a free end having an arcuate end surface, and the locking tab 444 includes a free end having a planar end surface. A fixing hole 446 is defined in the end of the fixing tab 442, corresponding to the round hole 244 of the sidewall 242. An elongate positioning hole 448 is defined in the end of the locking tab 444, corresponding to the locking hole 246 of the sidewall 242 and the through hole 268 of the fixing portion 26. A gasket 46 defining a round hole 460 is for being received in the fixing hole 446 of the fixing tab 442. The thickness of the gasket 46 is the same as the thickness of the locking tab 444. The gasket 46 is made of plastic.

The lock set 80 includes a lock 82, and a chain 84 connected to the lock 82. The lock 82 includes an operating portion 824, and a locking portion 822 extending from the operating portion 824. A lockpin 826 is formed on a free end of the locking portion 822. A keyhole 828 is defined in the operating portion 824. The chain 84 is made of steel or other material difficult to be broken. A loop 842 is formed on a free end of the chain 84.

Figure 3:
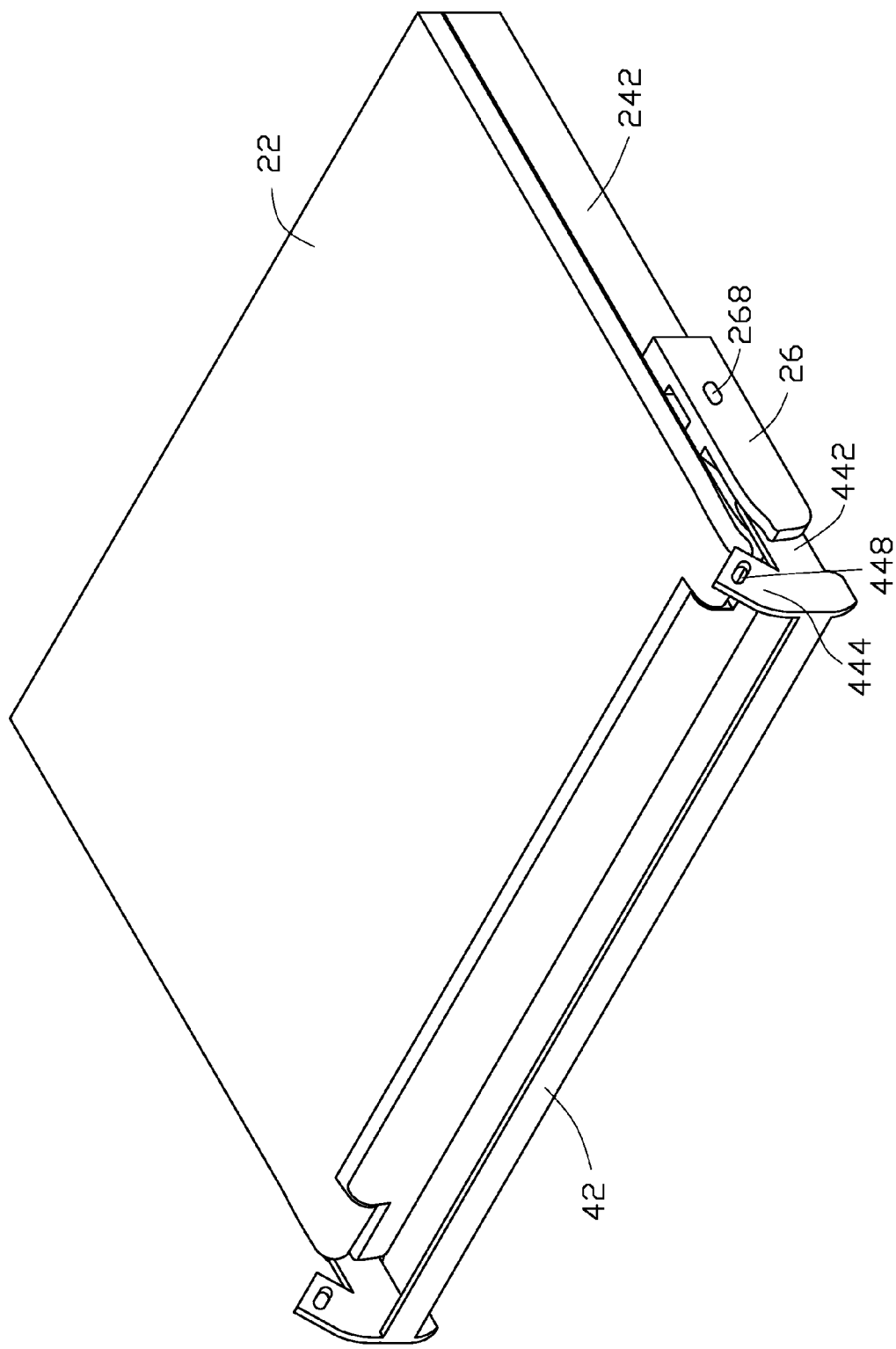
FIG. 3 is an assembled view of FIG. 1 without the lock set, showing the handle at an unlocked position.
Figure 4:
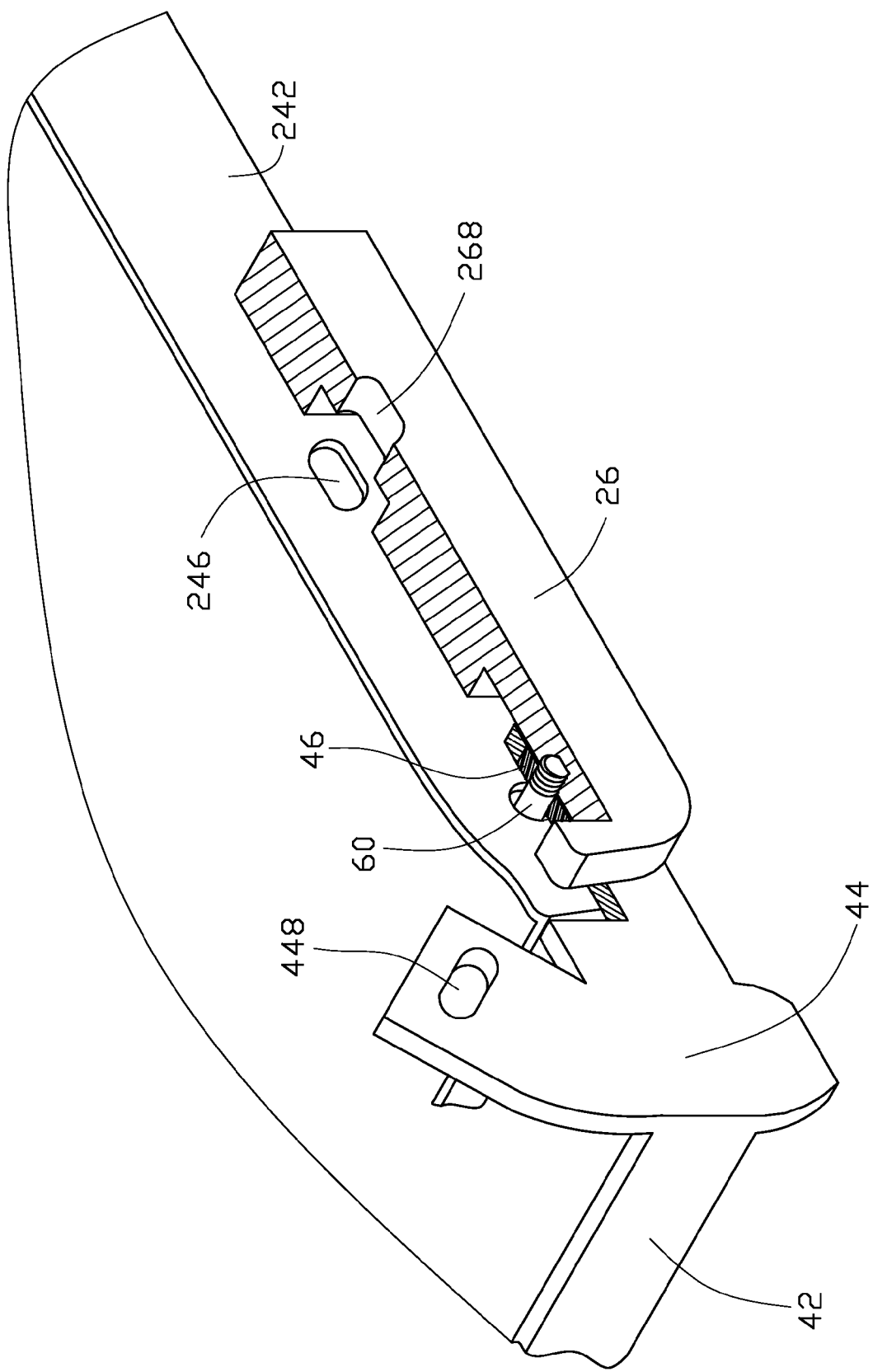
FIG. 4 is a partial cutaway view of a part of the base unit in FIG. 3.

Referring to FIGS. 3 and 4, in assembling, two gaskets 46 are respectively interferentially received in the fixing holes 446 of the installing portions 44. The fixing tabs 442 are respectively inserted into the receiving spaces 245 defined between the sidewalls 242 of the base unit 24 and corresponding fixing portions 26 respectively. The round holes 460 of the gaskets 46 align with the round holes 244 of the sidewalls 242, respectively. Two screws 60 extend from inside of the base unit 24 through the round holes 244 of the sidewalls 242 and the round holes 460 of the gaskets 46, and engage in the threaded holes 270 of the fixing portions 26, the handle 40 is thus pivotably mounted to the base unit 24. In this embodiment, a diameter of a rod of each screw 60 is slightly larger than a diameter of the round hole 460 of the corresponding gasket 46, the handle 40 can not pivot around the screws 60 without external force because of interferential interaction between the rods of the screws 60 and the gaskets 46.

Figure 5:
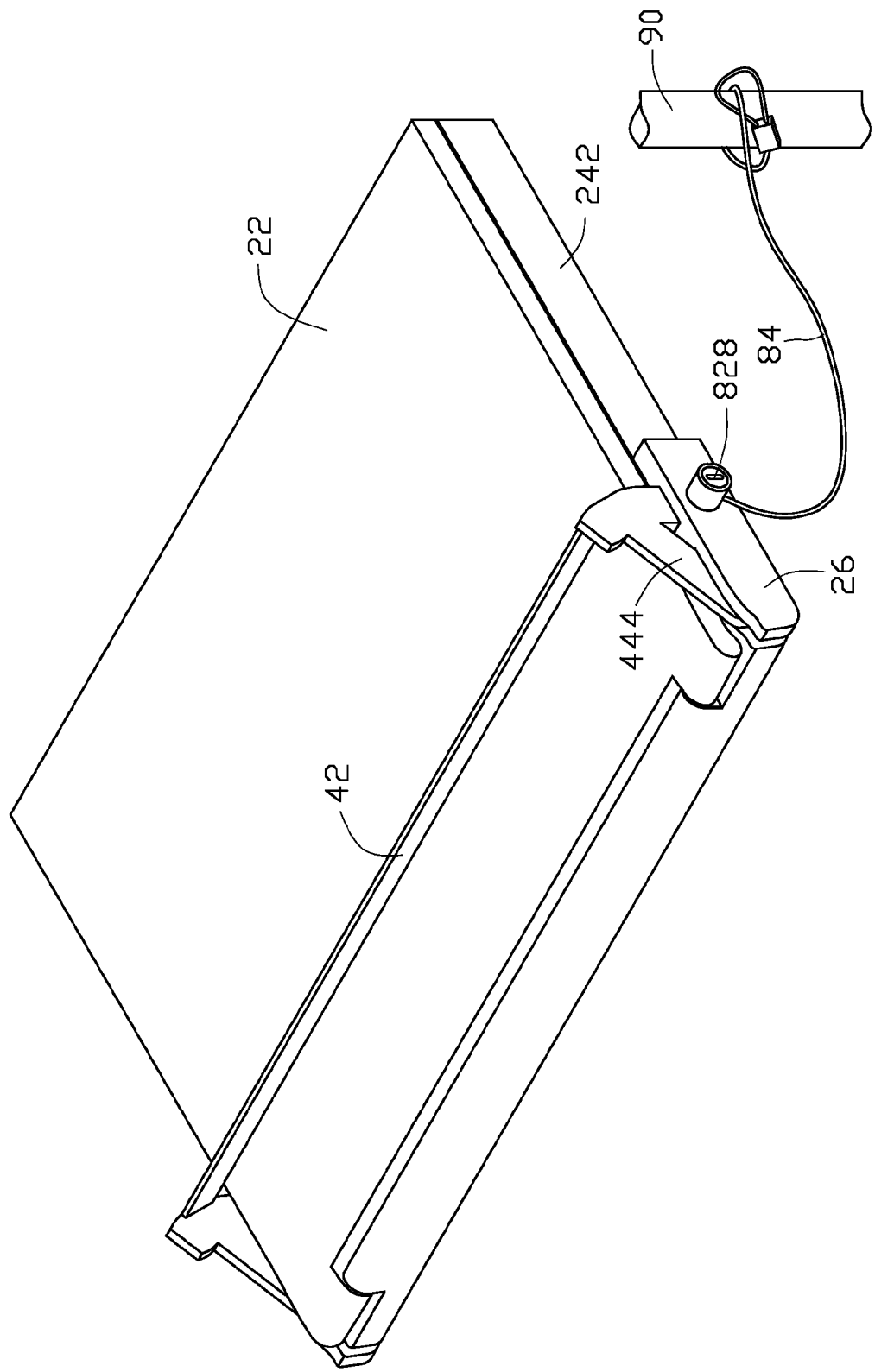
FIG. 5 is an assembled view of FIG. 1, showing the handle at a locked position.

Referring to FIGS. 4 and 5, in use, the cross bar 42 of the handle 40 can be lifted to carry the portable computer. When the portable computer is not in use, the cover unit 22 is pivoted to cover the base unit 24, and the keyboard installed on the base unit 24 is covered by the cover unit 22. The cross bar 42 is pulled toward the cover unit 22. The locking tabs 444 are respectively inserted into the spaces 247. The positioning holes 448 align with the locking holes 246 of the sidewalls 242 and the through holes 268 of the fixing portions 26, respectively. The chain 84 of the theftproof lock set 80 is passed around a fixture 90, such as a water pipe. The lock 82 is passed through the loop 842 of the chain 84. The locking portion 822 extends through the through hole 268 of one of the fixing portions 26, the positioning hole 448 of one of the locking tabs 444, and the locking hole 246 of one of the sidewalls 242, then is pivoted by a key (not shown) inserted into the keyhole 828 of the operating portion 824, whereby the lockpin 826 engages with an inner surface of the sidewall 242. Then the key is pulled out. The locking tab 444 is fixed to the sidewall 242 by the locking portion 822 of the lock set 80, thereby the handle 40 can not be pivoted. At this time, the cross bar 42 abuts against an upper surface of the cover unit 22, thereby the cover unit 22 can not be pivoted open. The display and the keyboard of the portable computer are hidden by the cover 22, thereby preventing unauthorized access to information stored in the portable computer via the keyboard and the display.

In other embodiments, two lock sets 80 can be respectively locked at the two sidewalls 242 of the base unit 24. The set 80 can be replaced by another kind of lock, such as a combination lock.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A portable computer comprising:
    a base unit;
    a cover unit pivotably connected to the base unit and movable between an open position and a closed position; and
    a handle pivotably mounted to the base unit, the handle forming a cross bar and at least one locking tab, the cross bar capable of abutting against the cover unit when the handle is at a fixed position, for preventing the cover unit from being pivoted open from the closed position, the locking tab engagable with the base unit for fixing the handle to the fixed position.

2. The portable computer as described in claim 1, wherein the at least one locking tab defines a positioning hole therein, a lock extends through the positioning hole to fix the at least one locking tab to the sidewall of the base unit such that the handle is at the fixed position.

3. The portable computer as described in claim 2, wherein the sidewall of the base unit defines an elongate locking hole therein and forms a fixing portion thereon, the fixing portion defines an elongate through hole aligning with the locking hole of the sidewall, the lock comprises a locking portion extending through the through hole of the fixing portion, the positioning hole of the at least one locking tab, and the locking hole of the sidewall to fix the at least one locking tab to the sidewall.

4. The portable computer as described in claim 3, wherein the lock further comprises an operating portion, the locking portion extends from the operating portion, a lockpin is formed on a free end of the locking portion, a keyhole is defined in the operating portion for allowing a key inserting therein to pivot the locking portion whereby the lockpin engages with an inner surface of the sidewall.

5. The portable computer as described in claim 3, wherein the fixing portion of the base unit forms a plate and two fixing legs connecting the sidewall and the plate, the sidewall, the plate, and the fixing legs cooperatively define a receiving space for receiving the at least one locking tab of the handle.

6. The portable computer as described in claim 2, wherein a chain is connected to the lock, the chain configured for wrapping about a fixture forms a loop on a free end thereof, and the lock passes through the loop.

7. The portable computer as described in claim 6, wherein the chain is made of steel.

8. The portable computer as described in claim 1, wherein the base unit further comprises an opposite sidewall, each of the sidewalls forms a fixing portion and defines a hole, the fixing portion defines a threaded hole in an inner surface thereof aligning with the hole, the handle further forms two fixing tabs extending from two ends of the cross bar respectively, each of the fixing tabs defines a fixing hole, two screws extend through the holes of the sidewalls and the fixing holes of the fixing tabs, and engage in the threaded holes of the fixing portions, whereby the handle is pivotably mounted to the base unit.

9. The portable computer as described in claim 8, wherein each of the fixing holes of the installing portions receives a gasket defining a round hole, the screws extend from inside of the base unit through the holes of the sidewalls and the round holes of the gaskets, and engage in the threaded holes of the fixing portions, a diameter of a rod of each screw is slightly larger than a diameter of the round hole of the corresponding gasket for keeping interferential interaction between the rods of the screws and the gaskets to prevent the handle from randomly pivoting around the screws without external force.

10. A portable computer comprising:
    a base unit comprising two opposite sidewalls;
    a cover unit pivotably connected to a rear end the base unit; and
    a handle pivotably mounted to the rear end of the base unit, the handle forming a cross bar configured for carrying the portable computer and at least one locking tab configured for engaging with one of the sidewalls of the base unit, the cross bar engagable with the cover unit for preventing the cover unit from being pivoted open from a closed position.

11. The portable computer as described in claim 10, wherein the at least one locking tab defines a positioning hole therein, a lock extends into the positioning hole to fix the at least one locking tab to the one of the sidewalls of the base unit.

12. The portable computer as described in claim 11, wherein the one of the sidewalls of the base unit defines an elongate locking hole therein and forms a fixing portion thereon, the fixing portion defines an elongate through hole aligning with the locking hole of the sidewall, the lock comprises a locking portion extending through the through hole of the fixing portion, the positioning hole of the at least one locking tab, and the locking hole of the one of the sidewalls to fix the at least one locking tab to the one of the sidewall.

13. The portable computer as described in claim 12, wherein the lock further comprises an operating portion, the locking portion extends from the operating portion, a lockpin is formed on a free end of the locking portion, a keyhole is defined in the operating portion for pivoting the locking portion whereby the lockpin engages with an inner surface of the one of the sidewalls.

14. The portable computer as described in claim 10, wherein each of the sidewalls forms a fixing portion and defines a round hole, each of the fixing portions defines a threaded hole in an inner surface thereof aligning with the round hole, the handle further forms two fixing tabs extending from two ends of the cross bar respectively, each of the fixing tabs defines a fixing hole, two screws extend from inside of the base unit through the round holes of the sidewalls and the fixing holes of the fixing tabs, and engage in the threaded holes of the fixing portions, whereby the handle is pivotably mounted to the base unit.

15. A portable computer comprising:

a base unit comprising two opposite sidewalls;

a cover unit connected to the base unit and being pivotable relative to the base unit between an open position where the computer is usable and a closed position where the cover unit covers the base unit to cause the computer being unusable;

a handle pivotably mounted to the sidewalls of the base unit, the handle comprising a cross bar configured for carrying the portable computer and a pair of installing portions extending from opposite ends of the cross bar respectively, each of the installing portions comprising a fixing tab pivotably attached to a corresponding one of the sidewalls of the base unit, the handle further comprising a locking tab; and a lock configured for locking the locking tab with one of the sidewalls of the base unit to keep the cross bar riding over and abutting the cover unit to prevent the cover unit from being pivoted from the closed position to the open position.

16. The portable computer as described in claim 15, wherein the locking tab extends from a conjunction between the cross bar and one of the fixing tabs.

17. The portable computer as described in claim 16, wherein each of the sidewalls forms a fixing portion which comprises a plate spaced from and parallel to the corresponding sidewall and a connecting section connected between the fixing portion and the corresponding sidewall with a space formed therebetween, the fixing tabs each having a distal end received in one of the spaces, the locking tab having a distal end received in one of the spaces when the locking tab is locked by the lock.

18. The portable computer as described in claim 17, wherein each of the sidewalls defines a through hole, each of the fixing portions defines a threaded hole in an inner surface thereof aligning with a corresponding through hole, each of the fixing tabs defines a fixing hole, two screws extend from inside of the base unit through the through holes of the sidewalls and the fixing holes of the fixing tabs, and engage in the threaded holes of the fixing portions, whereby the handle is pivotably mounted to the base unit.

* * * * *